(No Model.)

D. COLLARD.
SLEIGH BRAKE.

No. 483,429. Patented Sept. 27, 1892.

WITNESSES:
J. A. Burghton
E. M. Clark

INVENTOR
David Collard
BY
Munn & Co
ATTORNEYS.

UNITED STATES PATENT OFFICE.

DAVID COLLARD, OF HOPE, IDAHO, ASSIGNOR TO HIMSELF AND JOSEPH M. JEANNOT, OF SAME PLACE.

SLEIGH-BRAKE.

SPECIFICATION forming part of Letters Patent No. 483,429, dated September 27, 1892.

Application filed March 12, 1892. Serial No. 424,672. (No model.)

*To all whom it may concern:*

Be it known that I, DAVID COLLARD, of Hope, in the county of Kootenai and State of Idaho, have invented a new and useful Improvement in Sleigh-Brakes, of which the following is a full, clear, and exact description.

My invention relates to an improvement in sleigh-brakes, and has for its object to provide a brake of exceedingly simple, durable, and economic construction, capable of being applied to any sleigh in such a manner as to render it capable of being conveniently and expeditiously manipulated, and also whereby the attachment of the brake may be made in such a manner as not to weaken the runners of the sleigh.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
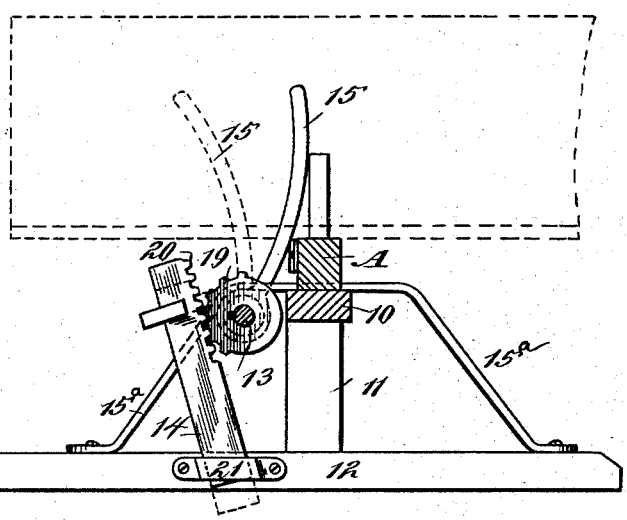
Figure 4:
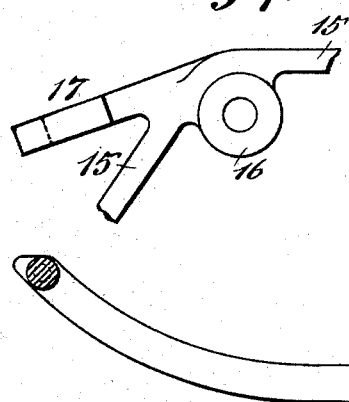
Figure 2:
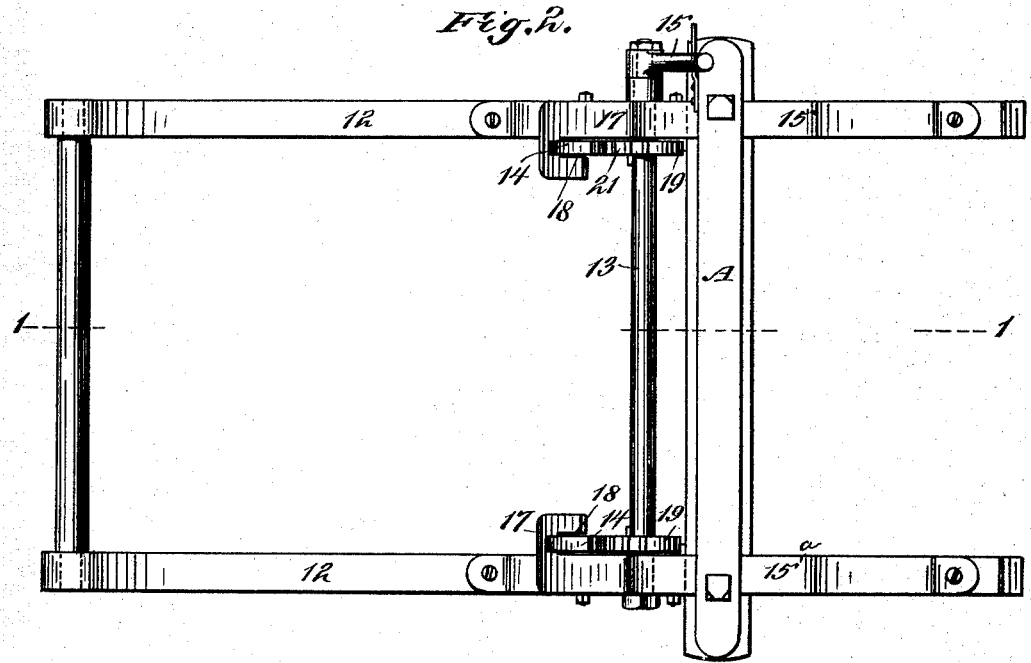
Figure 3:
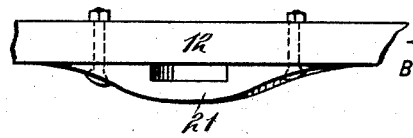

Figure 1 is a central vertical section through the running-gear of a sleigh, the section being taken practically on the line 1 1 of Fig. 2 and illustrating the application of the brake thereto. Fig. 2 is a plan view of the sleigh running-gear and of the brake. Fig. 3 is a detail plan view of a portion of one of the runners, illustrating the socket through which the brake passes; and Fig. 4 is a detail side elevation of a portion of a bearing in which the brake-shoe is journaled.

In front of the cross-bar 10, connecting the knees 11 of the sleigh-runners 12, the brake mechanism is located. This brake mechanism consists, primarily, of a brake shaft 13, brake shoes 14, actuated from the shaft, and a lever 15, adapted as a medium of actuating the shaft. Each runner is provided with the usual truss-brace 15ᵃ, which extends over the cross-bar 10 of the knees and beneath the bolster A, supported by said cross-bar. These truss-braces in front of the cross-bar have bearings 16 formed therein, (shown in detail in Fig. 4,) and from the top of each truss-brace a bracket 17 is forwardly and slightly downwardly projected, the bracket being essentially angular in general contour, its forward end being provided with a recess 18 therein, as best shown in Fig. 2.

The brake-shaft 13 is journaled in the bearings 16, and at one end of the shaft the lever or handle 15 is secured, through the medium of which it is turned. Near the inner face of each journal 16 of the brake-shaft a toothed wheel or pinion 19 is rigidly secured, and these pinions are adapted for engagement with the toothed or rack surfaces 20 of the brake-shoes 14. The brake-shoes 14 are located in front of the pinions 19, and consist, preferably, of bars of suitable length and thickness, ordinarily rectangular in cross-section, their outer ends being held to slide in and being guided by the recesses 18 in the brackets 17. The brake-shoes extend downwardly in a rearward direction through sockets 21, which are formed upon the inner faces of the runners 12, the inner end walls of the sockets having also a rearward inclination. These sockets serve as guides for the lower ends of the shoes, and by reason of their rearward inclination the lower extremities of the shoes are not parallel with the under faces of the runners. In fact, the lower edges of the shoes stand transversely with respect to these faces, as is best shown in Fig. 1.

In operation when the handle or lever 15 is in the upper position (shown in positive lines in Fig. 1) the brake-shoes are held out of engagement with the ground or the surface over which the runners are passing. Whenever it is desired to stop the sleigh entirely or to check its progress to any extent, the handle or lever 15, which may be as long as desired or operated by foot or hand, is carried forward to a greater or less degree, which rocks the shaft 13 in such a manner as to cause the pinions 19 of the shaft engaging with the rack-surfaces of the brake-shoes to force said shoes downward, so that their forward lower corners enter the surface over which the runners are passing and virtually lift the runners from the surface, serving as a brake, or to entirely stop the progress of the sleigh, according to the distance that the lever or handle 15 has been thrown forward.

The sleigh may be stopped and held upon the inclined surface of a hill, for instance, by simply carrying the handle or lever 15 forward, so as to force the shoes into the snow deeply, and the team, no matter how restive or eager, cannot move the vehicle.

It is obvious that this brake can be readily applied to any sleigh, and it is evident that it does not injure the runners, as the shoes pass down through sockets formed thereon. Again, the brake is capable of being expeditiously and conveniently operated and is positive and sure in its action. It is also evident that the rearward inclination of the brake-shoes materially assists in the braking operation, as it renders the shoes quick to respond to the movement of the shaft, and, furthermore, it presents the corner of the shoe to the surface to be entered instead of the entire end, thus permitting it more readily to enter the snow.

Having thus described my invention, I claim as new and desire to secure by Letters Patent—

1. The combination, with a sleigh the runners of which are provided with sockets upon their inner faces, the walls of said sockets having a rearward inclination, and bearings located upon the runners and brackets, projected forward from the bearings, said brackets being provided with recesses, of a shaft journaled in the bearings and having pinions attached thereto, a lever connected with the shaft, whereby it is rotated, and brake-shoes having a rearward inclination and guided at their upper ends in the recesses of the brackets and at their lower ends in the sockets of the runners, the said shoes being provided with teeth to engage the teeth of the pinions upon the shaft, as and for the purpose specified.

2. The combination, with a sleigh, of the truss-braces 15ª, provided with the bearings 16 and the recessed brackets 17, the shaft 13, mounted in the bearings and provided with a handle at one end, the pinion 19 on the shaft, and the brake-shoes 14, formed with toothed or rack surfaces 20 and fitted to slide in the said brackets, and brackets 21 on the runners, substantially as described.

DAVID COLLARD.

Witnesses:
 JOSEPH M. JRANNOT,
 WM. J. QUIRK.